F. SANDOR.
FLOWERPOT.
APPLICATION FILED MAR. 30, 1920.

1,376,117. Patented Apr. 26, 1921.

INVENTOR.
Ferdinand Sandor
BY
Harry Jacobson
ATTORNEYS.

UNITED STATES PATENT OFFICE.

FERDINAND SANDOR, OF THERESA, SASKATCHEWAN, CANADA.

FLOWERPOT.

1,376,117.  Specification of Letters Patent.  Patented Apr. 26, 1921.

Application filed March 30, 1920. Serial No. 369,996.

*To all whom it may concern:*

Be it known that I, FERDINAND SANDOR, citizen of Hungary, residing at Theresa, Province of Saskatchewan, Canada, have invented certain new and useful Improvements in Flowerpots, of which the following is a specification.

This invention relates to flower pots such as are used for living plants or flowers to hold a quantity of soil in which the flower or plant grows.

The invention has for objects to provide a flower pot with a simple arrangement of parts designed both for the moistening of the soil in the pot and for the easy removal of this soil as a mass for transplanting, or other purposes.

For further comprehension of the invention, and of the objects and advantages thereof, reference will be had to the following description and accompanying drawings, and to the appended claims in which the various novel features of the invention are more particularly set forth.

Figure 1 of the drawings is a side view of a flower pot having the invention applied thereto.

Figure 1:
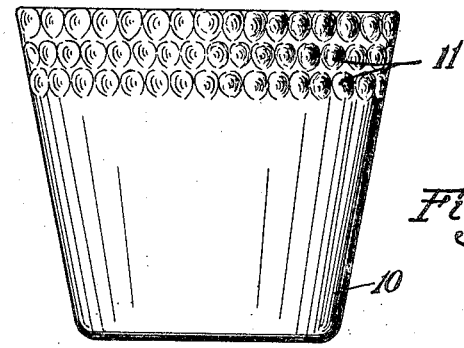
Figure 2:
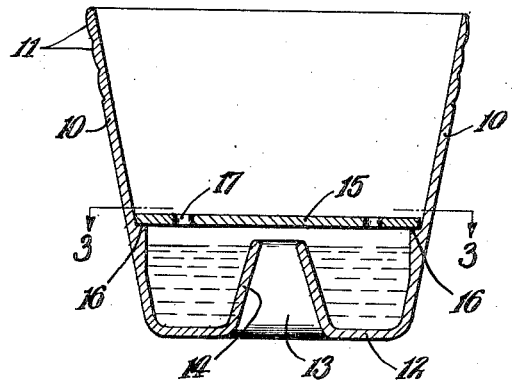
Fig. 2 is a central vertical sectional view thereof.
Figure 3:
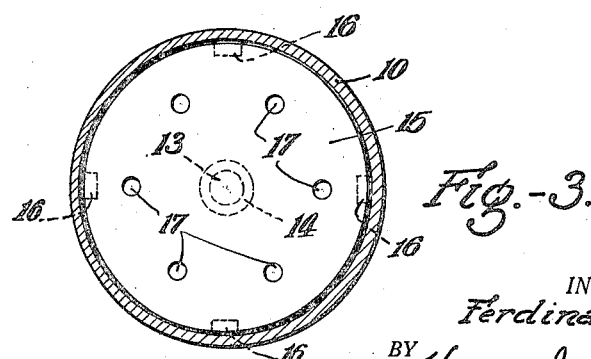
Fig. 3 is a horizontal section on the line 3—3 of Fig. 2.

My improved flower pot may be of the external appearance and configuration usual with flower pots, with flaring sides 10, and may have an ornamental border 11 around the top thereof. The bottom of the pot is shown at 12 and is flat throughout its main area and formed with a central opening 13 surrounded by an integral, upwardly projecting flange 14 of frusto-conical shape, the purpose of the provision of this opening being set forth later, the annular span in the lower end of the pot around this flange 14 forming a water receptacle.

To support the mass of earth in which the flower roots are embedded a supplementary bottom is formed in the pot just above the flange, this supplementary bottom being preferably constituted by a removable disk 15 which rests freely on a series of integral lugs 16 projecting inwardly from the flaring sides 10 of the pot and spaced evenly therearound, the disk 15 being of a diameter to fit snugly in the pot at this point. This supplementary bottom is formed with a series of apertures 17 therein to allow any excess of water which may be in the soil above the bottom after such soil has been moistened, to drip down into the bottom of the pot and also to allow the moist air to circulate upwardly. These apertures, as will be obvious, register with the annular space surrounding the flange.

In the use of my improved flower pot the span above the supplementary bottom 15 contains the soil in which the flower is planted, the space below the bottom receiving any excess of water after the soil has been moistened. Should it be desired at any time to remove the flower or plant for purposes of transplanting, or for any other purpose, a stick or other suitable article may be inserted upwardly in the opening 13 in the fixed bottom 12 and pressed against the removable supplementary bottom 15, lifting the latter, and with it the mass of soil, from the pot.

Having thus described my invention what I claim as new and desire to protect by Letters Patent of the United States is as follows:

1. A flower pot having an integral bottom formed with a central opening, an upwardly projecting flange surrounding said opening, and a disk forming a removable supplementary bottom supported adjacent the top of said flange, said disk having a series of apertures formed therein and registering with the annular space surrounding said flange.

2. A flower pot having an integral bottom, formed with a central opening, an upwardly projecting flange of frusto-conical shape surrounding said opening, a series of lugs projecting inwardly from the sides of the pot, and a disk freely supported on said lugs, said disk having a series of apertures formed therein and registering with the annular space surrounding said flange.

In testimony whereof I have affixed my signature.

FERDINAND SANDOR.